US006107623A

United States Patent [19]

Bateman et al.

[11] Patent Number: 6,107,623
[45] Date of Patent: Aug. 22, 2000

[54] METHODS AND APPARATUS FOR TANDEM MASS SPECTROMETRY

[75] Inventors: Robert Harold Bateman, Cheshire; John Brian Hoyes, Stockport, both of United Kingdom

[73] Assignee: Micromass Limited, Manchester, United Kingdom

[21] Appl. No.: 09/138,152

[22] Filed: Aug. 21, 1998

[30] Foreign Application Priority Data

Aug. 22, 1997 [GB] United Kingdom ................... 9717926

[51] Int. Cl.[7] ............................ B01D 59/44; H01J 49/26

[52] U.S. Cl. ............................................................ 250/282

[58] Field of Search ............................................. 250/282

[56] References Cited

U.S. PATENT DOCUMENTS

| | | | |
|---|---|---|---|
| 4,650,999 | 3/1987 | Fies, Jr. et al. | 250/282 |
| 4,818,862 | 4/1989 | Conzemius | 250/287 |
| 5,202,563 | 4/1993 | Cotter et al. | 250/287 |
| 5,206,508 | 4/1993 | Alderdice et al. | 250/282 |
| 5,233,189 | 8/1993 | Wollnik | 250/287 |

FOREIGN PATENT DOCUMENTS

| | | |
|---|---|---|
| 0 551 999 A1 | 7/1993 | European Pat. Off. . |
| 44 14 403 A1 | 10/1994 | Germany . |
| 2 250 632 | 6/1992 | United Kingdom . |

OTHER PUBLICATIONS

E. C. Huang et al., Rapid Communications in Mass Spectrometry, vol. 4, No. 11, 1990, pp 467–471, "Characterization of Cyclodextrins Using Ion–evaporation Atmospheric–pressure Ionization Tandem Mass Spectrometry".

R. A. Yost et al., Tandem Mass Spectrometry, Chapter 8, 1983, pp 175–195, "Tandem Quadrupole Mass Spectrometry".

T. J. Cornish et al., American Chemical Society, Chapter 6, 1994, pp 95–107, "A Dual–Reflectron Tandem Time–of–Flight Mass Spectrometer".

R. H. Bateman et al., Rapid Communications in Mass Spectrometry, vol. 9, 1995, pp 1227–1233, "A Combined Magnetic Sector—Time–of–flight Mass Spectrometer For Structural Determination Studies by Tandem Mass Spectrometry".

K. F. Medzihradszky et al., Journal of the American Society for Mass Spectrometry, vol. 7, 1996, pp 1–10, "Peptide Sequence Determination by Matrix–Assisted Laser Desorption Ionization Employing a Tandem Double Focusing Magnetic–Orthogonal Acceleration Time–of–Flight Mass Spectrometer".

F. H. Strobel et al., American Chemical Society, Chapter 5, 1994, pp 73–94, Tandem Time–of–Flight Mass Spectrometry.

(List continued on next page.)

*Primary Examiner*—Jack Berman
*Attorney, Agent, or Firm*—Alix, Yale & Ristas, LLP

[57] ABSTRACT

The invention provides methods and apparatus for tandem mass spectrometry (MS/MS) in which parent ions generated from a sample are passed through a mass filter (2) and are fragmented into daughter ions in fragmentation means (3), the daughter ions being passed through a discontinuous output mass analyser, such as a time-of-flight analyzer (16) or an ion storage device (29). The range of possible parent mass-to-charge ratios is split into a plurality of smaller ranges, and the mass filter (2) is set to pass ions of each smaller range in turn. A flag is set for each smaller range which produces daughter ions of interest, and the mass filter (2) is set to pass each mass-to-charge ratio of the flagged ranges so that the mass-to-charge ratios of the fragmented ions produced for each of the mass-to-charge ratios passed may be determined using the discontinuous analyser (16, 29). The flagged ranges may be themselves split into a plurality of still smaller ranges, which are correspondingly flagged.

31 Claims, 4 Drawing Sheets

OTHER PUBLICATIONS

A. T. Jackson et al., Rapid Communications in Mass Spectrometry, vol. 10, 1996, pp 1668–1674, "The Application of Matrix–assisted Laser Desorption/Ionization Combined with Collision–induced Dissociation to the Analysis of Synthetic Polymers".

F. H. Strobel et al., Analytical Chemistry, vol. 64, No. 7, Apr. 1, 1992, pp 754–762, "Neutral–Ion Correlation Measurements: A Novel Tandem Mass Spectrometry Data Acquisition Mode for Tandem Magnetic Sector/Reflectron Time–of–Flight Instruments".

G. L. Glish et al., Analytical Chemistry, vol. 56, No. 13, Nov. 1984, pp 2291–2295, "Tandem Quadrupole/Time–of–Flight Instrument for Mass Spectrometry/Mass Spectrometry".

K. R. Jonscher et al., Analytical Chemistry, vol. 68, No. 4, Feb. 15, 1996, pp 659–667, "Mixture Analysis Using a Quadrupole Mass Filter/Quadrupole Ion Trap Mass Spectrometer".

R. G. Cooks et al., The 38th ASMS Conference on Mass Spectrometry and Allied Topics, Jun. 3–8, 1990, pp 1460–1461, "Hybrid Mass Spectrometers".

P. Kofel et al., The 38th ASMS Conference on Mass Spectrometry and Allied Topics, Jun. 3–8, 1990, pp 1462–1463, "Quadrupole Quistor Quadrupole Tandem Mass Spectrometry of Organic Ions".

J. D. Pinkston et al., Rev. Sci. Instrum., vol. 57, No. 4, Apr. 1986, pp 583–592, "New time–of–flight mass spectrometer for improved mass resolution, versatility, and mass spectrometry/mass spectrometry studies".

D. R. Jardine et al., Organic Mass Spectrometry, vol. 27, 1992, pp 1077–1083, "A Tandem Time–of–flight Mass Spectrometer".

METHODS AND APPARATUS FOR TANDEM MASS SPECTROMETRY

This invention relates to methods of operating tandem mass spectrometers which comprise a final stage analyzer which is incapable of continuously transmitting an ion beam, for example a time-of-flight mass analyzer or an ion storage device such as a quadrupole ion trap, and apparatus for performing those methods. In particular, the invention provides improved methods analogous to the method of "parent ion scanning" conventionally used with tandem quadrupole-based mass spectrometers.

Tandem mass spectrometry (MS/MS) is the name given to a group of mass spectrometric methods wherein parent ions generated from a sample are fragmented to yield one or more daughter ions which are subsequently mass analysed. The methods are useful for the analysis of complex mixtures, especially of biomolecules, primarily because their specificity can eliminate the need for chemical clean-up prior to mass spectral analysis. In an example of an MS/MS method, parent ions are generated from a sample and passed through a first mass filter to select those ions having a particular mass-to-charge ratio. These ions are then fragmented, typically by collisions with neutral gas molecules in a suitable ion containment device, to yield daughter ions, the mass spectrum of which is recorded by a second mass analyzer. The daughter ion spectra so produced are indicative of the structure of the parent ion, and the two stages of mass filtering eliminates much of the "chemical noise" present in the conventional mass spectrum of a complex mixture.

One variation on this basic method of MS/MS, known as parent ion scanning, is useful when it is not possible to identify parent ions in the direct mass spectrum of a sample because of the presence of chemical noise. This situation is frequently encountered in, for example, the electrospray mass spectra of biomolecules. In this method, generally carried out on triple quadrupole mass spectrometers, the second mass filter is set to transmit daughter ions having a mass-to-charge ratio known to be characteristic of the type of parent ion under investigation. The first mass filter, ahead of the fragmentation means, is then scanned while monitoring for the transmission of relevant daughter ions through the second mass filter. This determines the parent ion mass-to-charge ratios which yield the characteristic daughter ions. The complete daughter ion spectrum for each of these parent ion mass-to-charge ratios may then be determined by setting the first mass analyzer to transmit each parent ion mass-to-charge ratio in turn and scanning the second analyzer to record the complete daughter ion spectrum for each parent ion. Application of such a method is described by Huang and Henion in Rapid Communications in Mass Spectrometry, 1990 vol 4 (11) pp 467–471.

The most common prior type of MS/MS instrument is the triple quadrupole (see, for example, Yost, Enke in Ch. 8 of Tandem Mass Spectrometry, Ed. McLafferty, pub. John Wiley and Sons, 1983). These consist of two quadrupole mass filters separated by a fragmentation means, (usually a quadrupole mass filter operated in the RF only mode as an ion containment device and containing a collision gas at a pressure of between 1 and 10 millitorr). However, many other types of "hybrid" tandem mass spectrometers are also known, including various combinations of magnetic sector analyzers and quadrupole filters. These hybrid instruments often comprise high resolution magnetic sector analysers (ie, analyzers comprising both magnetic and electrostatic sectors arranged in a double-focusing combination) as either or both of the mass filters. Use of high resolution mass filters is highly effective in reducing chemical noise to very low levels.

Consequent upon advances in ionization techniques such as electrospray and laser desorption which have made it possible to generate molecular ions from samples having very high molecular weights, time-of-flight mass spectrometers have become a preferred method of mass analysis for many biomolecules at femtomole levels of concentrations. Time-of-flight analysers have virtually unlimited mass range and very high efficiency, particularly when used in conjunction with pulsed ionization sources such as a matrix assisted laser desorption ionization (MALDI) source. Time-of-flight mass analyzers determine the mass of all of the ions present in a pulse of ions generated by a pulsed source in a very short time (that of the flight time of the slowest ion), which results in their being able to record a complete spectrum virtually instantaneously (at least in comparison with a scanning quadrupole or magnetic sector analyser). Various tandem time-of-flight mass spectrometers are known. Instruments comprising two time-of-flight analyzers with a collision cell for fragmenting ions disposed between them are taught by U.S. Pat. No. 5,202,563, GB patent application 2,250,632, and by Cornish and Cotter in Symposium No 549, Ch. 6 pp 95–107, published by American Chemical Society. Also known are tandem mass spectrometers comprising a magnetic sector analyser and a time-of-flight analyser (see, eg, Bateman, Green et al, Rapid Communications in Mass Spectrometry, 1995 vol 9 pp 1227–33, Medzihradsky, Adams et al. J. Amer. Soc. Mass Spectrom. 1996 vol 7 pp 1–10, European patent application No 551999, Strobel and Russell (Symp 549, ibid, ch 5 pp 73–94), Jackson, Yates et al. Rapid Communications in Mass Spectrum. 1996 vol 10 pp 1668–1674, and Strobel, Preston et al. Anal. Chem. 1992 vol 64 pp 754–762. Quadrupole time-of-flight tandem mass spectrometers are also known (eg, Glish, Goeringer, Anal. Chem. 1984 vol 56 pp 2291–95).

Tandem mass spectrometers having a quadrupole ion trap as the final analyzing stage are also known (see, for example, Jonscher and Yates in Anal. Chem. 1996 vol 68 pp 659–667, Cooks and Morand in Proc. 38$^{th}$ Ann. Confr. Am. Soc. Mass Spectrom., Tuscon, AZ, June 1990 pp 1460–1, Kofel, Reinhard and Schlunegger, ibid, pp 1462–63, and German Patent Application DE 4414403 (1994). Because the ion storage device used in these instruments can be used to cause fragmentation of the ions entering it as well as mass analyzing them, these instruments need not incorporate a separate collision cell. The use of an ion storage device in place of a quadrupole mass filter as the second stage mass analyzer has certain advantages (for example, the ease of studying granddaughter ions in MS$^n$ experiments), but typically they exhibit lower sensitivity, dynamic range and mass range than the conventional triple quadrupole. However, none of the above publications describe a method of operation analogous to the parent ion scanning mode used with triple quadrupole mass analyzers, for either a time-of-flight or an ion-trap instrument.

In fact, it can be predicted that use of directly equivalent methods of parent ion scanning would result in very low sensitivity if used with a tandem mass spectrometer having a time-of-flight or a quadrupole ion trap analyzer as the final stage. Although time-of-flight analyzers are most suited to pulsed ionization sources, they can be used in conjunction with a continuous ionization source with high efficiency because they are capable of repetitively recording a complete spectrum almost instantaneously and with a high duty cycle in comparison with the time taken to scan such a spectrum with a quadrupole or magnetic sector analyzer. However, they are inherently inefficient if used as a mass filter (that is, to continuously transmit ions having particular mass-to-charge ratios) because of the pulsed nature of their operation. Thus, very poor efficiency would result if such an instrument is used in the parent ion scanning mode to transmit likely daughter ions to a detector while the first mass analyzer is scanned to detect parent ions. For example, in such a mode, the time-of-flight analyzer may have a combined transmission efficiency and sampling duty cycle of about 2% , which may be compared to a figure of 50% for a quadrupole mass filter. Consequently, to achieve comparable performance in the parent ion scanning mode it would be necessary to acquire data for perhaps 25 times longer using a time-of-flight analyzer rather than a quadrupole analyzer. Similar considerations apply to the case of an ion storage device such as a quadrupole ion trap, which, like the time-of-flight analyzer, can only transmit ions to a detector following a significant period of ion storage.

In the following, the term "discontinuous output mass analyzer" is used to refer to mass analyzers which cannot produce a continuous flow of mass-selected ions for detection or admission to another analyzer, for example a time-of-flight analyzer or a quadrupole ion trap.

It is an object of the invention, therefore, to provide efficient methods of operating a tandem mass spectrometer which comprises a discontinuous output mass analyser as the final analyzer to record daughter ion spectra without the need to identify parent ions in a mass spectrum of a sample. It is a further object to provide apparatus for carrying out those methods.

In accordance with these objectives the invention provides a method of tandem mass spectroscopy comprising the steps of:

a) ionizing a sample to generate a population of ions which comprises one or more parent ions;

b) passing at least some ions comprised in said population of ions through a mass filter to select only ions having mass-to-charge ratios in a first predetermined range;

c) admitting ions selected in step b) to fragmentation means to produce daughter ions from any said parent ions so selected;

d) using a discontinuous output mass analyzer, determining whether any daughter ions of interest have been produced by said fragmentation means, and flagging said first predetermined range if any said daughter ions of interest are detected;

e) repeating steps b)–d) using different first predetermined ranges until said mass filter has been set to transmit to said fragmentation means all the mass-to-charge ratios which it is thought said parent ions may possess;

f) setting said mass filter to transmit to said fragmentation means ions having mass-to-charge ratios in a second predetermined range which comprises one or more of the mass-to-charge ratios comprised in one of said first predetermined ranges flagged in step d);

g) determining the mass-to-charge ratios of ions leaving said fragmentation means using said discontinuous output mass analyzer;

h) repeating steps f) and g) using different second predetermined ranges until said mass filter has been set to transmit all of the mass-to-charge ratios comprised in all of said first predetermined ranges flagged in step d).

Thus in one method according to the invention the daughter ion spectra of parent ions may be obtained without first identifying said parent ions in a mass spectrum of a sample.

In one preferred method, said discontinuous output mass analyzer may comprise a time-of-flight mass analyzer. In another preferred method, said discontinuous output mass analyzer may comprise an ion-storage device, for example a quadrupole ion trap. In the latter case, said fragmentation means may comprise the ion storage device itself, so that ions are admitted to the storage device in step c), where at least some of them may be fragmented to generate daughter ions by collision with gas molecules in the storage device.

In a preferred method said second predetermined ranges comprise only a single mass-to-charge ratio so that in step g) the discontinuous output mass analyser determines the daughter ion spectrum of a single parent ion. Consequently, once step h) has been completed, daughter ion spectra for every parent ion comprised in the flagged first predetermined ranges will have been acquired and unambiguously assigned to a particular parent ion.

In another preferred method, said second predetermined range comprises several nominal mass-to-charge ratios and the discontinuous output mass analyzer is used in step g) to flag those second predetermined ranges which comprise ions which yield daughter ions of interest, as in step d) carried out in respect of ions comprised in the first predetermined ranges. To complete the process, the mass filter is then set in turn to transmit each nominal mass-to-charge ratio comprised in the flagged second predetermined ranges to record a daughter ion spectrum which is unambiguously assigned to a particular parent ion.

It is also within the scope of the invention to use more than two sets of predetermined ranges, each subsequent set comprising a smaller number of mass-to-charge ratios, and flagging each time only those ranges which result in the formation of daughter ions of interest. In the final set of experiments each predetermined range is narrowed to a single mass-to-charge ratio, as in the previous preferred methods. For most applications, however, the use of only one or two predetermined ranges is adequate.

Various methods can be used to detect the presence of daughter ions of interest produced by the fragmentation means in step d). The discontinuous output mass analyzer may be used to identify the mass-to-charge ratios of all the ions emerging from the fragmentation means so that the first predetermined range may be flagged if any of the mass-to-charge ratios so determined correspond to the mass-to-charge ratios of expected daughter ions. Alternatively, daughter ions formed by the fragmentation of multiply charged parent ions can be detected from the presence of ions having mass-to-charge ratios higher than the mass-to-charge ratios of the parent ions comprised in the first predetermined range. If any such ions are present in the output of the discontinuous output mass analyzer, they must represent daughter ions which have a lower number of charges than the multiply charged ion from which they have been formed. This method is particularly appropriate when the parent ions are generated by the electrospray ionization of high molecular weight species, which typically produces ions with a high number of charges. Methods according to the invention can also be used to generate neutral loss spectra, that is, a spectrum of all parent ions which produce daughter ions by the loss of the same characteristic neutral fragment. In this case, the first predetermined ranges may be flagged if daughter ions are found at mass-to-charge ratios smaller than each of the mass-to-charge ratios of the parent ions comprised in the predetermined range by the mass of the characteristic neutral fragment.

Using the methods of the invention, therefore, complete daughter ion spectra can be produced for every parent ion without the need to produce a spectrum at every mass-to-charge ratio where a parent ion might exist and without the inefficiency that would result if the discontinuous output mass analyzer was used to continuously transmit ions while the mass filter was scanned. The number of daughter ion spectra which need to be acquired using the methods of the invention is much smaller than the number of possible parent ion masses, as can be seen from the following examples.

EXAMPLE 1

Parent ions in a sample are thought to have mass-to-charge ratios between 300 and 2300. Using the first preferred method of the invention, each first predetermined mass range may be chosen as 10 nominal mass-to-charge ratios, so that steps b)–d) are repeated 200 times to cover the possible range of parent ion mass-to-charge ratios. Typically, 10 of these first predetermined ranges may generate daughter ions of interest. Steps f) and g) are therefore repeated 100 times using second predetermined ranges of a single nominal mass-to-charge ratio in order to cover all the mass-to-charge ratios in the flagged first predetermined ranges. Thus a total of 300 daughter ion spectra are acquired, to be compared with 2,000 if a complete spectrum was recorded at all the possible parent ion masses.

EXAMPLE 2

Using the second preferred method of the invention with the same sample used for example 1, the first predetermined ranges may be chosen to comprise 25 mass-to-charge ratios, so that 80 daughter ion spectra need to be acquired in steps b)–d) to cover the range of 300–2300 mass units. Typically, 10 of these may be flagged in step d). The second predetermined ranges may then be chosen to comprise 5 mass-to-charge ratios, so that steps f) and g) need to be repeated 50 times to cover the 10 flagged first predetermined ranges. Typically, 10 of these second predetermined ranges will produce daughter ions of interest. Finally, therefore, a further 50 daughter ion spectra need to be acquired to cover each nominal mass-to-charge ratio in the second predetermined ranges which yield daughter ions. This method therefore requires only 80+50+50=180 daughter ion scans to produce daughter ion spectra from every parent ion.

Methods according to the invention using a discontinuous output mass analyzer, and especially a time-of-flight mass analyzer as the final analyzer in a tandem mass spectrometer have several advantages over the prior method of parent ion scanning used in triple quadrupole spectrometers. For example, methods according to the invention permit the surveying of several characteristic daughter ions in a single experiment and eliminate the need to guess which are the most likely daughter ions which is a requirement of the prior parent ion scanning method. Further, a time-of-flight mass analyzer detects daughter ions which occur at higher mass-to-charge ratios than their parent ion, which indicates that the parent ion was multiply charged, as explained previously. Also, the complete daughter ion spectra of all the candidate parent ions is immediately available, and it is not necessary to select candidate parent ions and to separately determine their daughter ion spectrum as with the prior parent ion scanning method. This is particularly advantageous when several parent ions are to be investigated. Finally, neutral loss spectra can be acquired, as explained above, in the same series of experiments as conventional daughter ion spectra providing that suitable criteria are set for flagging the presence of daughter ions of interest in each of the first predetermined ranges.

Viewed from another aspect the invention provides a tandem mass spectrometer comprising means for ionizing a sample, a mass filter which receives ions from said means for ionizing, fragmentation means for producing daughter ions from parent ions exiting from said mass filter, a discontinuous output mass analyzer for mass analyzing ions produced by said fragmentation means and control means for setting said mass filter to transmit ions having mass-to-charge ratios within a predetermined range and for causing said discontinuous output mass spectrometer to produce a mass spectrum of the ions entering it, characterized in that said control means comprises:

a) means for setting said mass filter to transmit ions which have mass-to-charge ratios in a first predetermined range;

b) means for determining from the output of said discontinuous output mass analyzer whether any daughter ions of interest are comprised in the ions leaving said fragmentation means while step a) is being carried out, and for flagging said predetermined range if any are so detected;

c) means for repeating steps a) and b) using different first predetermined ranges until said mass filter has been set to transmit all the mass-to-charge ratios which it is thought said parent ions may possess;

d) means for setting said mass filter to transmit ions which have mass-to-charge ratios in a second predetermined range which comprises one or more of the mass-to-charge ratios comprised in any one of said first predetermined ranges flagged in step b);

e) means for causing said discontinuous output mass analyzer to record the mass spectrum of ions leaving said fragmentation means while step d) is being carried out;

f) means for repeating steps d) and e) using different said second predetermined ranges until said mass filter has been set to transmit all of the mass-to-charge ratios comprised in all of said first predetermined ranges flagged in step b).

In a first preferred embodiment, said discontinuous output mass analyzer comprises a time-of-flight mass analyzer. However, in another preferred embodiment, said discontinuous output mass analyzer comprises an ion-storage device, for example a quadrupole ion trap.

In a first preferred embodiment of the apparatus, said control means sets each of said second predetermined ranges to a single mass-to-charge ratio so that the mass spectra acquired in each of steps e) is a daughter ion spectrum unambiguously assigned to a particular parent ion having that mass-to-charge ratio. In another preferred embodiment, however, the control means sets each of the second predetermined mass ranges to encompass several mass-to-charge ratios and flags those of the second predetermined ranges which yield daughter ions of interest in step e). The control means then sets the mass filter to transmit in turn ions which have each of the mass-to-charge ratios comprised in the flagged second predetermined ranges and causes said discontinuous mass analyzer to acquire the complete daughter ion spectrum for each of these mass-to-charge ratios.

Further preferably, the mass filter comprises a quadrupole mass filter and said fragmentation means comprises a collision cell containing a collision gas at a pressure of between $10^{-3}$ and 1 torr. Typically, the collision gas may comprise an inert gas such as argon or nitrogen, or a hydrocarbon gas such as methane. For maximum efficiency the collision cell may comprise a quadrupole or hexapole ion guide contained in a substantially gas-tight enclosure. Further ion guides or electrostatic lenses may advantageously be employed to maximize ion transmission between various parts of the apparatus.

Typically, the means for ionizing a sample will comprise an electrospray, API or MALDI (matrix assisted laser desorption) ionization source of conventional type. The control means may comprise a suitably programmed computer which controls power supplies connected to electrodes comprised in apparatus according to the invention to provide the sequence of voltages necessary for the methods to be carried out. Preferably also the control means incorporates means for storing mass spectra generated by the discontinuous output mass analyzer and for displaying them when required by an operator.

Preferred embodiments of the present invention will now be described in greater detail, by way of example only, with reference to the accompanying drawings, in which.

Figure 1:
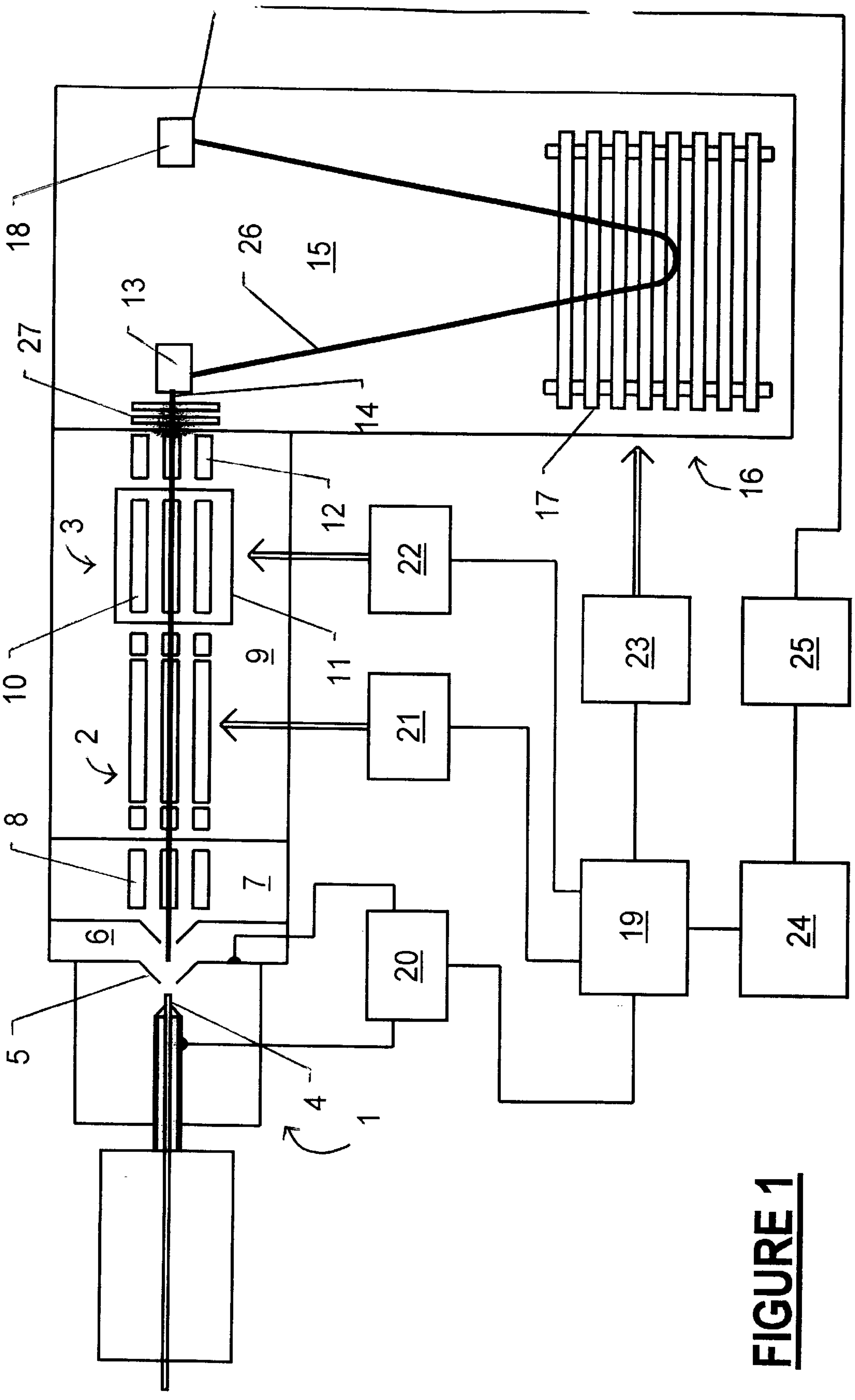
FIG. 1 is a schematic drawing of apparatus according to the invention suitable for carrying out the methods of the invention and in which the discontinuous output mass analyzer comprises a time-of-flight mass analyzer.

Referring first to FIG. 1, a preferred embodiment of the apparatus for carrying out the invention comprises an ionization source 1, a mass filter 2, fragmentation means 3 and a time-of-flight mass analyzer generally indicated by 16. The methods of the invention are most useful for the analysis of mixtures of biomolecules so that a preferred ionization source 1 is an electrospray ionization source comprising an electrospray needle 4 and the counter electrode 5. A power supply 20 maintains a potential difference of 1–5 kV between the needle 4 and the counter electrode 5 to cause electrospray ionization of the sample solution. Ions generated in the electrospray, which is carried out at atmospheric pressure or thereabouts, pass through an aperture in the counter electrode 5 into a first evacuated chamber 6 which is maintained at a pressure of between 1 and 10 torr by a vacuum pump (not shown), and then into a second evacuated chamber 7, maintained at a pressure of between $10^{-3}$ and $10^{-2}$ torr by another vacuum pump (not shown). A hexapole ion guide 8 is disposed in the chamber 7 to improve ion transmission efficiency.

A quadrupole mass filter 2 is disposed in a third evacuated chamber 9 which is maintained at a pressure less than $10^{-5}$ torr. The electrodes comprising the mass filter 2 are connected to a power supply 21 which generates both RF and DC potentials which determine both the actual value and the range of mass-to-charge values that are transmitted by it. A fragmentation means 3, disposed to receive ions which are transmitted by the mass filter 2, comprises a second hexapole ion guide 10 enclosed by a substantially gas-tight casing 11 into which a collision gas such as helium, argon, nitrogen or methane may be introduced at a pressure of between $10^{-3}$ and $10^{-1}$ torr. Suitable RF potentials for the electrodes comprising the hexapole ion guide 10 are provided by a power supply 22.

Ions exiting from the fragmentation means 3 are converged via a third hexapole ion guide 12 and an electrostatic lens assembly 27 into an "ion pusher" 13 of a time-of-flight mass analyzer generally indicated by 16. The ion pusher 13 comprises a series of electrodes to which suitable voltages are applied in sequence to cause a packet of ions to be ejected from the ion beam 14 and travel through the drift region 15 of the time-of-flight analyzer 16 to an ion mirror 17 and then to an ion detector 18 following a trajectory exemplified by path 26. The pressure in the drift region 15 is maintained at $10^{-7}$ torr or better by another vacuum pump (not shown). Means are provided for measuring the transit time of the ions comprised in the packet so that their mass-to-charge ratios can be determined. The ion pusher 13, ion mirror 17 and detector 18 are parts of a conventional "reflectron" type of time-of-flight mass spectrometer with orthogonal acceleration, and need not be described in detail.

A control means 19 provides control signals for power supplies 20–23 which respectively provide the necessary operating potentials for the electrospray ion source 1, quadrupole mass filter 2, fragmentation means 3 and the time-of-flight mass analyzer 16. These control signals determine the operating parameters of the instrument, for example the mass-to-charge ratios transmitted through the mass filter 2 and the operation of the analyzer 16. The control means 19 is itself controlled by signals from a computer 24 which is also used to process mass spectral data acquired from a signal conditioner 25 which receives signals from the detector 18. The conditioner 25 also enables the computer 24 to display and store mass spectra produced from the analyzer 16 and to receive and process commands from an operator for setting up the methods described below.

Figure 2:
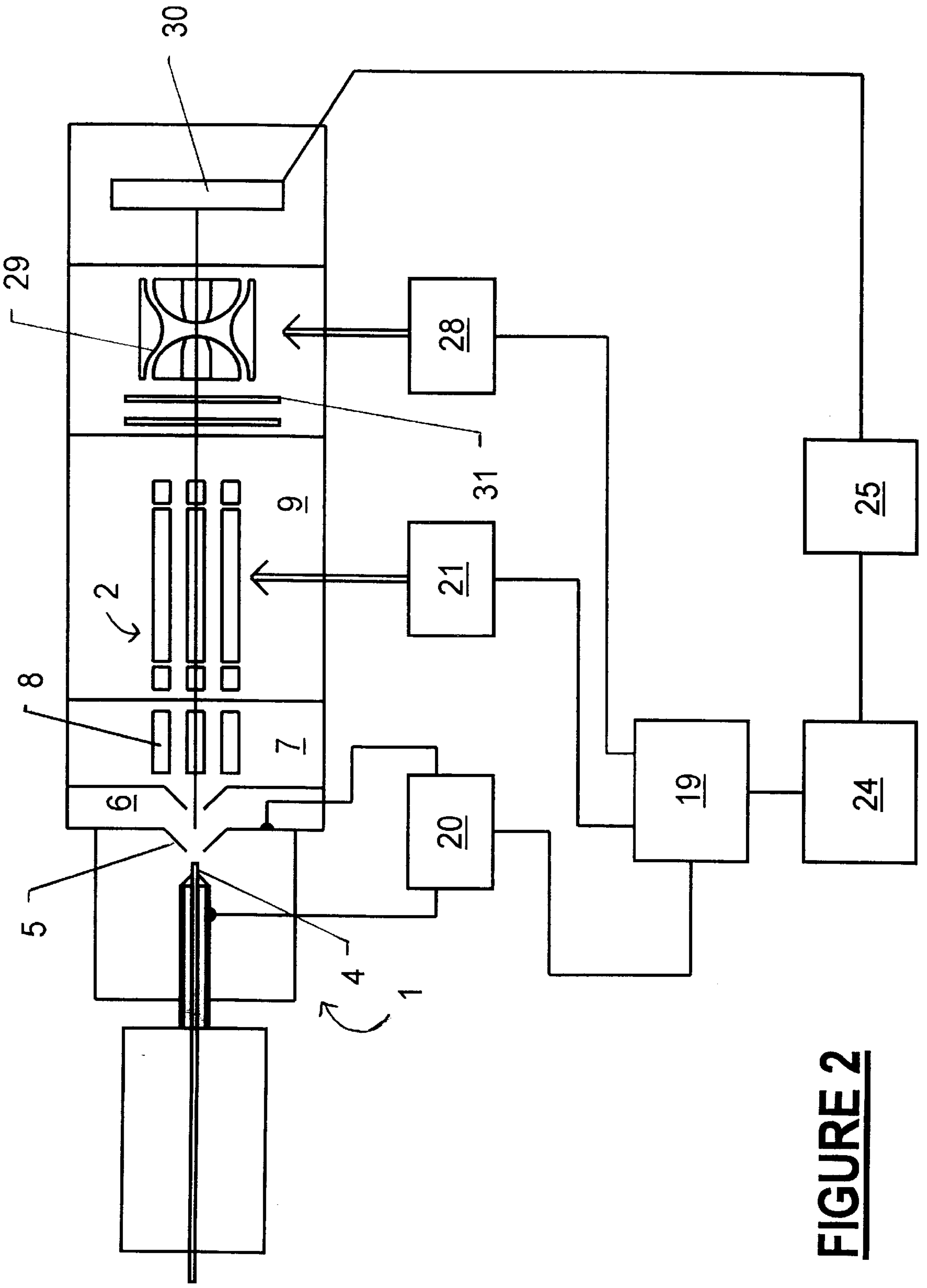
FIG. 2 is a schematic drawing of apparatus according to the invention suitable for carrying out the methods of the invention and in which the discontinuous output mass analyzer comprises an ion storage device.

FIG. 2 shows another preferred embodiment of the invention wherein the discontinuous output mass analyzer comprises a quadrupole ion trap 29 disposed to receive ions entering from the mass filter 2. An ion detector 30 is provided to detect ions ejected from the trap after mass selection. A controller 28, itself controlled by the control means 19, provides the necessary supply potentials for the trap 29. In this embodiment, the fragmentation means is incorporated in the trap 29 which contains a bath gas at a pressure sufficiently high to cause fragmentation of ions in the trap when suitable excitation signals are applied to the trap electrodes by the controller 28, as in a stand-alone ion trap used for MS/MS experiments. Thus, when the apparatus of FIG. 2 is used for a method according to the invention, ions comprised in each predetermined range of mass-to-charge ratios transmitted in turn by the mass filter 2 are temporarily stored in the trap. The ion beam exiting from the mass filter 2 is then gated off by means of suitable potentials applied to a set of focusing-gating electrodes 31. Suitable excitation signals may then be applied to the electrodes of trap 29 so that at least some of the ions stored in it are caused to fragment, and the daughter ions so generated may then be sequentially ejected to reach the detector 30, again using conventional methods of operating the trap 29. The mass filter 2 may then be set to transmit the next predetermined range of mass-to-charge ratios, and the potentials applied to the focusing-gating electrodes 31 adjusted to allow the ions to enter the trap 29. The fragmentation and daughter ion ejection steps are then repeated. Signals from the detector 30 are processed by the signal conditioner 25 in a similar manner to that described previously for the time-of-flight analyzer.

Figure 3:
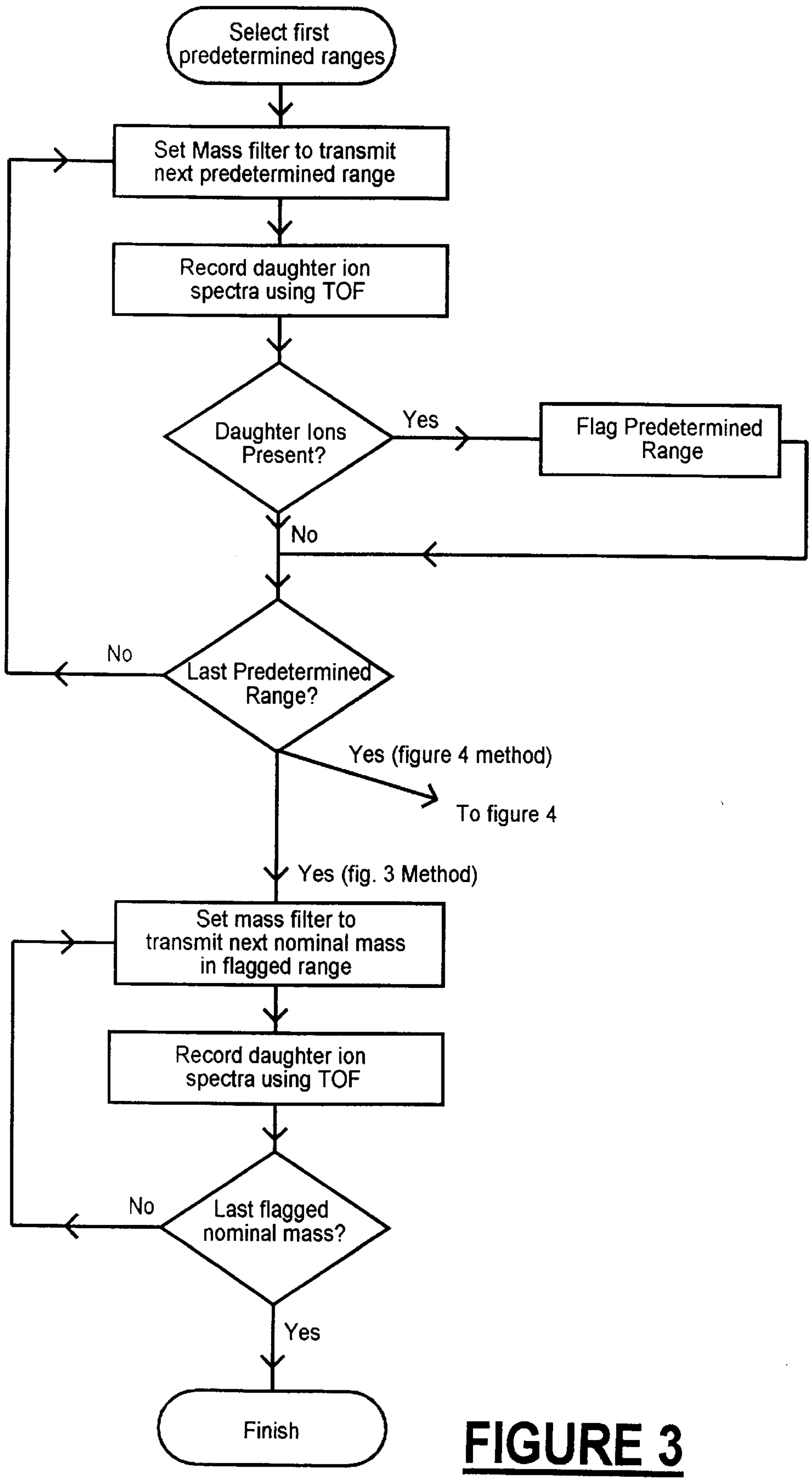
FIG. 3 is a flow diagram representing a first method according to the invention.

Referring next to FIG. 3, an operator may first decide on the range of mass-to-charge ratios into which candidate parent ions are likely to fall and divide this range into a number of first predetermined ranges, entering these details into the computer 24. For example, if it is thought that parent ions are likely to occur in the range of mass-to-charge ratios from 300 to 2300, an operator may choose 200 first predetermined ranges, each covering ten mass units. The extent of each of these predetermined ranges is chosen bearing in mind the requirement that the mass filter 2 must be capable of transmitting simultaneously (and with reasonably constant efficiency) all the mass-to-charge ratios comprised in each one. The maximum usable range may therefore be limited, particularly if the mass filter 2 is a magnetic sector analyzer. In cases where the number of fragmented ions is expected to be large, an operator may also enter details of the daughter ions of interest so that only those first predetermined ranges which generate those daughter ions are flagged. For example, if a parent ion scan is to be produced, the mass-to-charge ratios of the expected daughter ions may be specified to limit the flagged ranges to those which generate the relevant daughter ions. If a neutral loss scan is to be produced, the computer 24 may be programmed to flag only those predetermined ranges which generate ions having mass-to-charge ratios smaller than the parent ion mass-to-charge ratios by the mass of the expected neutral fragment. A sample is then introduced into the ionization source 1, and the computer 24 adjusts the mass filter 2 (via the control means 19 and the power supply 21) to transmit simultaneously all of the mass-to-charge ratios comprised in the first one of the first predetermined ranges. Ions having mass-to-charge ratios in this range enter the fragmentation means 3 where they may undergo fragmentation. Any daughter ions produced in the fragmentation means 3 enter the ion pusher 13 of the time-of-flight analyzer 16 and their mass spectrum may be recorded (via the signal conditioner 25) by the computer 24. If the operator has previously specified the nature of the expected daughter ions, the recorded mass spectrum may then be examined by the computer 24 to determine whether any of these daughter ions are present, and if any are found, the range which generated the spectrum is flagged to indicate their presence. Alternatively, in the case of daughter ions having fewer charges than their multiply-charged parent ions (such as are frequently encountered in the electrospray mass spectroscopy of high molecular weight samples), the time-of-flight analyzer 16 may be used merely to sum the intensities of the ions having mass-to-charge ratios greater than the highest mass-to-charge ratio in the predetermined range. If this sum is significantly greater than zero then the presence of daughter ions having a mass-to-charge ratio greater than that of the parent ion of highest mass-to-charge ratio present in the predetermined range, is indicated and the range is flagged accordingly. The computer 24 then repeats this process for the remaining first predetermined ranges and flags any ranges found to generate likely daughter ions.

In the event that the mass-to-charge ratios of likely daughter ions are unknown, and no daughter ions with mass-to-charge ratios higher than those of the parent ions are either expected or found, the computer 24 may carry out the above process without flagging the spectra, storing each mass spectrum as it is acquired. The operator may then review the stored spectra manually flagging any ranges whose spectrum is thought to contain likely daughter ions.

Once the ranges which generate likely daughter ions have been flagged, the computer 24 sets the mass filter 2 to transmit in turn a second predetermined range (in this case a single nominal mass-to-charge ratio) from the set of mass-to-charge ratios comprised in all of the flagged first predetermined ranges, and causes the analyzer 16 to record a mass spectrum for each of these mass-to-charge ratios. In this way daughter ion spectra are produced and unambiguously assigned to their parent ions without the need for acquiring and storing spectra at every mass-to-charge ratio in the originally chosen range and without the need to recognize the parent ions in the mass spectrum of the sample. If the operator chooses to review the spectra from the first predetermined ranges, it is not even necessary to guess the likely daughter ion masses which would be essential using the prior parent ion scanning method with a triple quadrupole tandem mass spectrometer.

Figure 4:
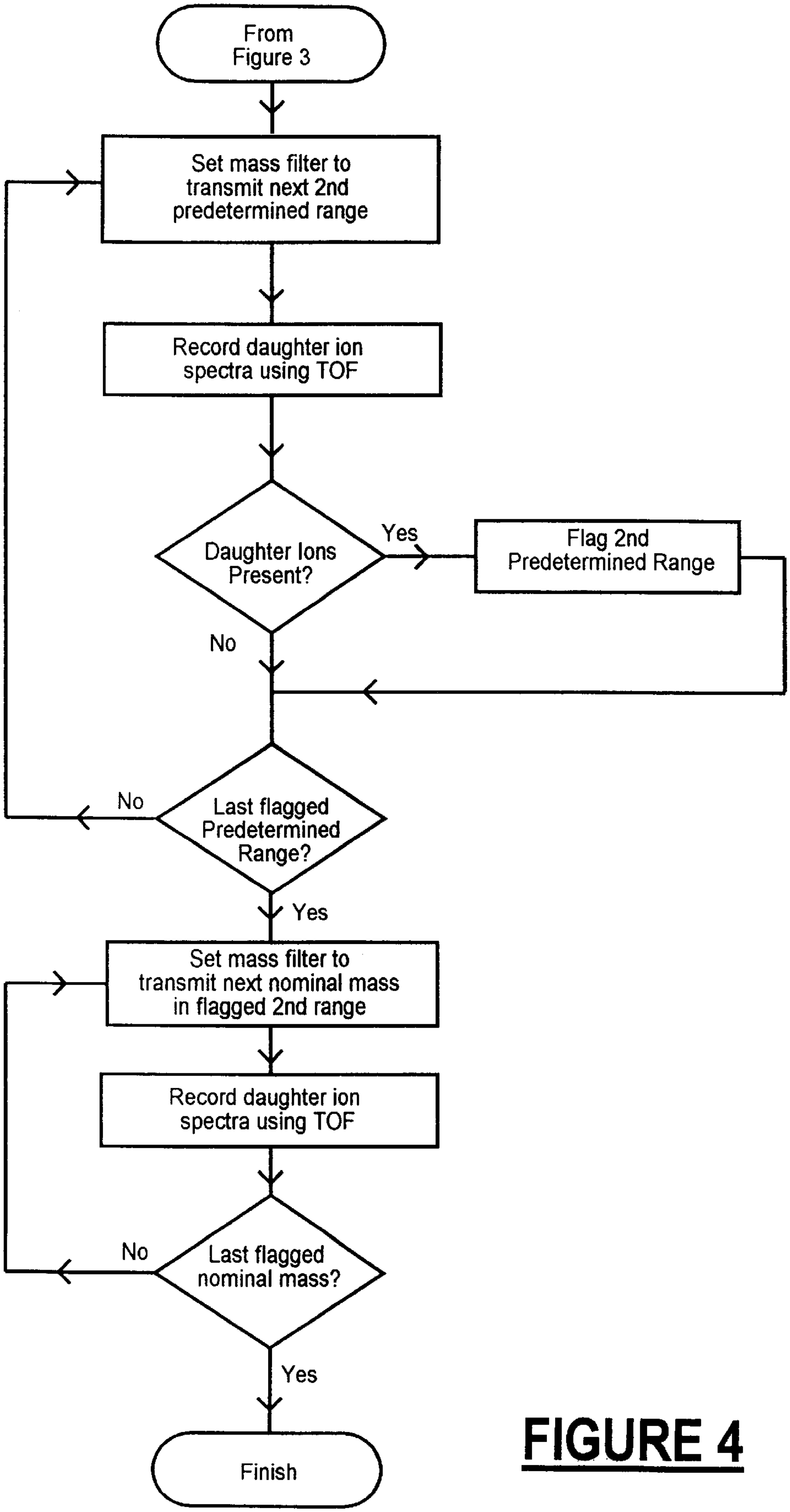
FIG. 4 is a flow diagram representing a second method according to the invention.

A further reduction in the total number of spectra which have to be recorded may be achieved by using the method illustrated in FIG. 4. The first part of this method is substantially the same as the FIG. 3 method, except that for maximum advantage the first predetermined ranges may comprise a greater range of mass-to-charge ratios than would typically be chosen for the FIG. 3 method. (For example, 25 instead of 10). In contrast to the FIG. 3 method, however, the second predetermined mass ranges are chosen to comprise more than one mass-to-charge ratio, for example, five mass-to-charge ratios. Finally, when the spectra of the second predetermined ranges have been recorded and their corresponding ranges flagged if they generate likely daughter ions, the mass filter 2 is set to transmit each of the mass-to-charge ratios comprised in the flagged second predetermined ranges and the complete daughter ion spectra recorded and unambiguously assigned to their parent ions.

What is claimed is:

1. A method of tandem mass spectroscopy comprising the steps of:

a) ionizing a sample to generate a population of ions which comprises one or more parent ions;

b) passing at least some ions comprised in said population of ions through a mass filter to select only ions having mass-to-charge ratios in a first predetermined range;

c) admitting ions selected in step b) to fragmentation means to produce daughter ions from any said parent ions so selected;

d) using a discontinuous output mass analyzer, determining whether any daughter ions of interest have been produced by said fragmentation means, and flagging said first predetermined range if any said daughter ions of interest are detected;

e) repeating steps b)–d) using different first predetermined ranges until said mass filter has been set to transmit to said fragmentation means all the mass-to-charge ratios which it is thought said parent ions may possess;

f) setting said mass filter to transmit to said fragmentation means ions having mass-to-charge ratios in a second predetermined range which comprises one or more of the mass-to-charge ratios comprised in one of said first predetermined ranges flagged in step d);

g) determining the mass-to-charge ratios of ions leaving said fragmentation means using said discontinuous output mass analyzer;

h) repeating steps f) and g) using different second predetermined ranges until said mass filter has been set to transmit all of the mass-to-charge ratios comprised in all of said first predetermined ranges flagged in step d).

2. A method as claimed in claim 1 wherein said discontinuous output mass analyzer comprises a time-of-flight mass analyzer.

3. A method as claimed in claim 1 wherein said discontinuous output mass analyzer comprises an ion storage device.

4. A method as claimed in claim 1 wherein said second predetermined ranges each comprise only a single nominal mass-to-charge ratio.

5. A method as claimed in claim 1 wherein:

a) said second predetermined ranges each comprise several nominal mass to charge ratios; and b) said discontinuous output mass analyzer is used to flag those of said second predetermined ranges which result in daughter ions of interest; and c) said mass filter is set in turn to transmit each nominal mass-to-charge ratio comprised in each of said flagged second predetermined ranges to record a daughter ion spectrum which is unambiguously related to a particular parent ion.

6. A method as claimed in claim 1 wherein more than two sets of predetermined ranges are used, each subsequent set comprising a smaller number of mass-to-charge ratios than the preceding set, and wherein only those of each set of predetermined ranges which result in the formation of daughter ions of interest are flagged, and wherein each predetermined range comprised in the final set comprises only a single mass-to-charge ratio.

7. A method as claimed in claim 1 wherein a spectrum comprising parent ions which fragment to give a particular daughter ion is constructed from the data so acquired.

8. A method as claimed in claim 4 wherein a spectrum comprising parent ions which fragment to give a particular daughter ion is constructed from the data so acquired.

9. A method as claimed in claim 5 wherein a spectrum comprising parent ions which fragment to give a particular daughter ion is constructed from the data so acquired.

10. A method as claimed in claim 1 wherein a spectrum comprising parent ions which fragment by the loss of a particular neutral fragment to give daughter ions is constructed from the data so acquired.

11. A method as claimed in claim 4 wherein a spectrum comprising parent ions which fragment by the loss of a particular neutral fragment to give daughter ions is constructed from the data so acquired.

12. A method as claimed in claim 5 wherein a spectrum comprising parent ions which fragment by the loss of a particular neutral fragment to give daughter ions is constructed from the data so acquired.

13. A method as claimed in claim 1 wherein at least two of the following types of MS/MS spectra are constructed from the data so acquired in a single experiment:

a) the partial or complete daughter ion spectra of one or more particular parent ions;

b) spectra which comprise the parent ions which fragment to give a particular daughter ion; or c) spectra which comprise the parent ions which fragment by the loss of a particular neutral fragment to give daughter ions.

14. A method as claimed in claim 4 wherein at least two of the following types of MS/MS spectra are constructed from the data so acquired in a single experiment:

a) the partial or complete daughter ion spectra of one or more particular parent ions;

b) spectra which comprise the parent ions which fragment to give a particular daughter ion; or c) spectra which comprise the parent ions which fragment by the loss of a particular neutral fragment to give daughter ions.

15. A method as claimed in claim 5 wherein at least two of the following types of MS/MS spectra are constructed from the data so acquired in a single experiment:

a) the partial or complete daughter ion spectra of one or more particular parent ions;

b) spectra which comprise the parent ions which fragment to give a particular daughter ion; or c) spectra which comprise the parent ions which fragment by the loss of a particular neutral fragment to give daughter ions.

16. A tandem mass spectrometer comprising an ionization source for ionizing a sample, a mass filter which receives ions from said ionization source, an ion fragmenter for producing daughter ions from parent ions exiting from said mass filter, a discontinuous output mass analyzer for mass analyzing ions produced by said fragmenter and a controller for setting said mass filter to transmit ions having mass-to-charge ratios within a predetermined range and for causing said discontinuous output mass spectrometer to produce a mass spectrum of the ions entering it, characterized in that said controller is programmed to:

a) set said mass filter to transmit ions which have mass-to-charge ratios in a first predetermined range;

b) determine from the output of said discontinuous mass analyzer whether any daughter ions of interest are comprised in the ions leaving said fragmenter while step a) is being carried out, and to flag said predetermined range if any are so detected;

c) repeat steps a) and b) using different first predetermined ranges until said mass filter has been set to transmit all the mass-to-charge ratios which it is thought said parent ions may possess;

d) set said mass filter to transmit ions which have mass-to-charge ratios in a second predetermined range which comprises one or more of the mass-to-charge ratios comprised in any one of said first predetermined ranges flagged in step b);

e) cause said discontinuous output mass analyzer to record the mass spectrum of ions leaving said fragmenter while step d) is being carried out;

f) repeat steps d) and e) using different said second predetermined ranges until said mass filter has been set to transmit all of the mass-to-charge ratios comprised in all of said first predetermined ranges flagged in step b).

17. A tandem mass spectrometer as claimed in claim 16 wherein said discontinuous output mass analyzer comprises a time-of-flight mass analyzer.

18. A tandem mass spectrometer as claimed in claim 16 wherein said discontinuous output mass analyzer comprises an ion storage device.

19. A tandem mass spectrometer as claimed in claim 18 wherein said ion storage device is a quadrupole ion trap.

20. A tandem mass spectrometer as claimed in claim 16 wherein said controller sets each of said second predetermined ranges to a single nominal mass-to-charge ratio.

21. A tandem mass spectrometer as claimed in claim 16 wherein said controller is further programmed to:

a) set each of said second predetermined ranges to encompass several mass-to-charge ratios and to flag those of said second predetermined ranges which yield daughter ions of interest; and b) subsequently set said mass filter to transmit in turn ions which have each of the mass-to-charge ratios comprised in said flagged second predetermined ranges; and c) cause said discontinuous output mass analyzer to acquire the daughter ion spectrum for each of those mass-to-charge ratios.

22. A tandem mass spectrometer as claimed in claim 16 wherein said mass filter comprises a quadrupole mass filter.

23. A tandem mass spectrometer as claimed in claim 16 wherein said fragmenter uses a collision gas at a pressure of between $10^{-3}$ and 1 torr.

24. A tandem mass spectrometer as claimed in claim 23 wherein said fragmenter comprises a multipole ion guide.

25. A tandem mass spectrometer as claimed in claim 16 wherein said ionization source comprises an electrospray ion source.

26. A tandem mass spectrometer as claimed in claim 16 wherein said ionization source comprises an atmospheric pressure ionization source.

27. A tandem mass spectrometer as claimed in claim 16 wherein said ionization source comprises a matrix assisted laser desorption ion source.

28. A method of tandem mass spectrometry in which parent ions generated from a sample are passed through a mass filter and are fragmented into daughter ions and passed through a discontinuous output mass analyser, the method comprising the steps of:

a) splitting a range of mass-to-charge ratios which it is though that parent ions of interest may possess into a plurality of smaller ranges, b) setting said mass filter to pass ions of each said smaller range in turn, and flagging the smaller ranges for which it is determined using said discontinuous output mass analyser that daughter ions of interest are produced; and c) setting said mass filter to pass each mass-to-charge ratio of said flagged ranges, and determining through said discontinuous output mass analyser the mass-to-charge ratios of fragmented ions produced for each of said mass-to-charge ratios passed.

29. The method of claim 28, wherein said step b) is repeated one or more times, each subsequent time splitting the flagged ranges from the previous split into smaller ranges and flagging those of the smaller ranges which produce said daughter ions of interest, said step c) being carried out in respect of the flagged ranges from the final split.

30. A tandem mass spectrometer comprising means for generating parent ions from a sample, a mass filter for receiving said parent ions, fragmentation means for producing daughter ions from parent ions passed through said mass filter, a discontinuous output mass analyzer for analyzing ions produced by said fragmentation means, and control means for controlling the operation of said mass filter and mass analyser;

wherein said control means sets said mass filter to pass ions in a plurality of mass-to-charge ratio ranges in turn, and flags the ranges for which it is determined using said discontinuous output mass analyser that daughter ions of interest are produced, said ranges covering the range of mass-to-charge ratios which it is though that parent ions of interest may possess; and wherein said control means further sets said mass filter to pass each mass-to-charge ratio of said flagged ranges, and determines through said discontinuous output mass analyser the mass-to-charge ratios of fragmented ions produced for each of said mass-to-charge ratios passed.

31. The apparatus of claim 30, wherein said control means repeats, one or more times, both the setting of the mass filter to pass a plurality of ranges in turn and the flagging of the ranges which produce daughter ions of interest, the control means in each subsequent repeat splitting the flagged ranges from the previous split into smaller ranges and flagging those of the smaller ranges which produce daughter ions of interest, said setting of said mass filter to pass each mass-to-charge ratio of said flagged ranges being carried out in respect of the flagged ranges from the final split.

* * * * *